United States Patent [19]
Ishibashi et al.

[11] Patent Number: 5,599,253
[45] Date of Patent: Feb. 4, 1997

[54] DECELERATION CONTROL APPARATUS FOR TWO-CYCLE ENGINE OF THE SPARK IGNITION TYPE FOR A VEHICLE

[75] Inventors: Yoichi Ishibashi; Masahiro Asai; Shinichi Isomura; Takeshi Koyabu, all of Saitama, Japan

[73] Assignee: Honda Giken Kogyo Kabushiki Kaisha, Tokyo, Japan

[21] Appl. No.: 348,897

[22] Filed: Nov. 25, 1994

[30] Foreign Application Priority Data

Nov. 27, 1993 [JP] Japan ..................... 5-321036

[51] Int. Cl.⁶ .............. F02B 9/00; F02B 11/00; F02M 17/38
[52] U.S. Cl. .................... 477/111; 123/65 PE
[58] Field of Search .............. 477/111; 123/65 PE, 123/65 EM, 65 P

[56] References Cited

U.S. PATENT DOCUMENTS

| | | | |
|---|---|---|---|
| 4,180,029 | 12/1979 | Onishi . | |
| 4,213,431 | 7/1980 | Onishi . | |
| 4,445,468 | 5/1984 | Onishi et al. . | |
| 4,793,347 | 12/1988 | Taniuchi et al. | 123/65 PE |
| 4,966,115 | 10/1990 | Ito et al. | 123/418 |
| 5,174,172 | 12/1992 | Kanemura et al. | 477/102 |
| 5,183,013 | 2/1993 | Ito et al. | 123/65 PE |
| 5,403,246 | 4/1995 | Umemoto | 477/101 |
| 5,410,993 | 5/1995 | Masuda et al. | 123/65 PE |

FOREIGN PATENT DOCUMENTS

| | | |
|---|---|---|
| 0636776 | 6/1994 | European Pat. Off. . |
| 2376296 | 12/1977 | France . |
| 2515260 | 5/1982 | France . |
| 56-38766 | 9/1981 | Japan . |
| 56-54336 | 12/1981 | Japan . |
| 62-23523 | 1/1987 | Japan . |
| 3-33426 | 2/1991 | Japan . |
| 2235494 | 2/1990 | United Kingdom . |

OTHER PUBLICATIONS

Patent Abstracts Of Japan, vol. 14, No. 237 (M–0976) May 21, 1990.
Patent Abstracts Of Japan, vol. 12, No. 464 (M–771) Dec. 6, 1988.

*Primary Examiner*—Dirk Wright
*Attorney, Agent, or Firm*—Birch, Stewart, Kolasch & Birch, LLP

[57] ABSTRACT

A deceleration control apparatus is provided which can control a two-cycle engine of the spark ignition type for a vehicle, in which fresh air in a combustion chamber can be self-ignited at an ignition timing preferable for operation of the engine at least upon low load operation, so that, when engine sudden deceleration requirements are satisfied, the combustion condition is automatically changed over from an activated heat atmosphere combustion condition to an ordinary combustion condition to allow sudden deceleration of the engine. A sudden deceleration requirement discrimination CPU for discriminating requirements which require sudden deceleration of the vehicle receives, in addition to a detection signal from a throttle valve opening sensor, detection signals from a vehicle speed sensor, a kill switch, a main switch, a brake switch for detecting that the brakes are applied, a clutch switch for detecting that the clutch is disconnected, and a gear position switch for detecting that the shift operation position is operated to the neutral position, and when the requirements which require sudden deceleration are satisfied, the sudden deceleration requirement discrimination CPU sends an exhaust control valve opening correction signal to an exhaust control valve CPU.

13 Claims, 7 Drawing Sheets

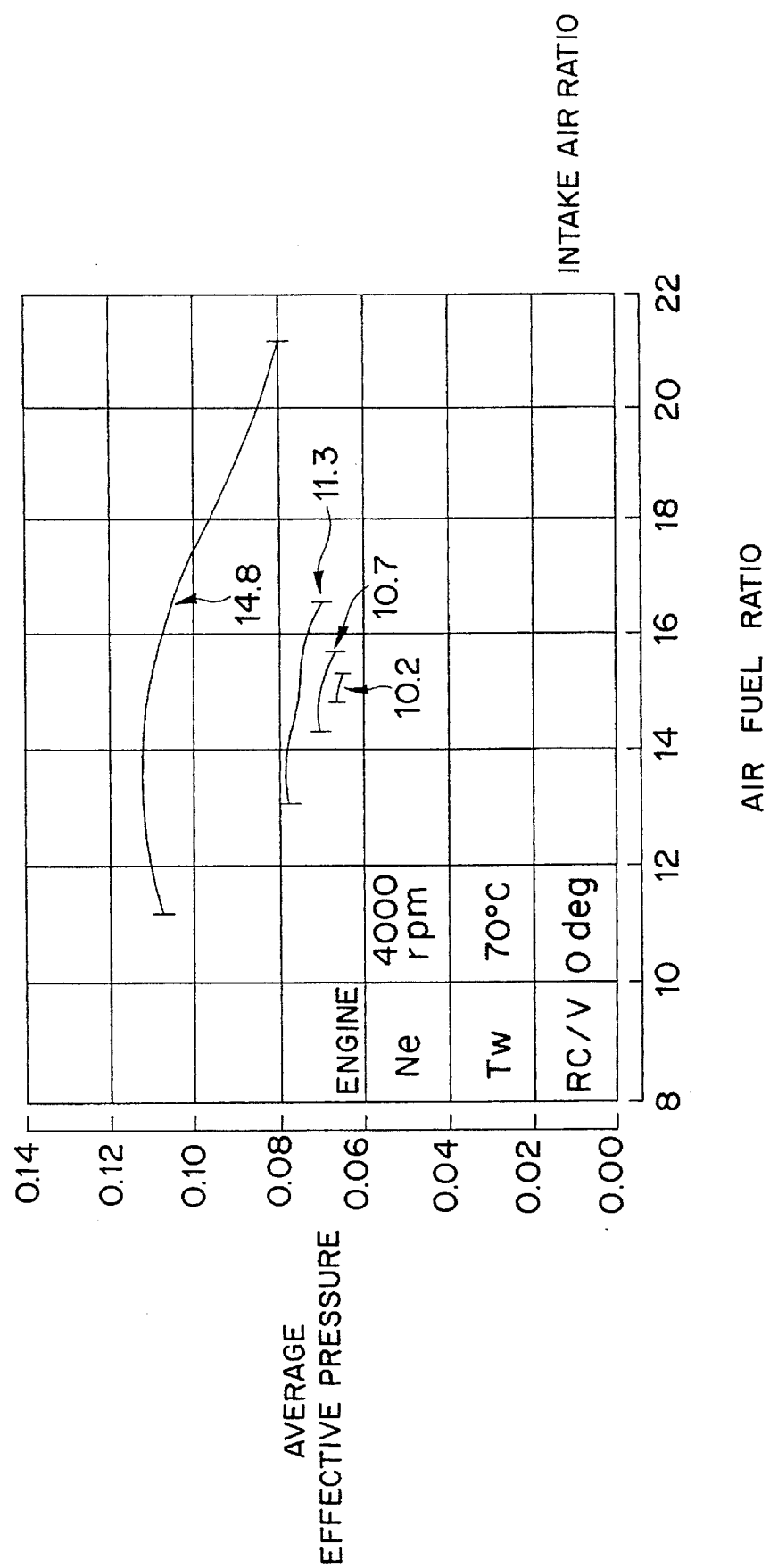

DECELERATION CONTROL APPARATUS FOR TWO-CYCLE ENGINE OF THE SPARK IGNITION TYPE FOR A VEHICLE

BACKGROUND OF THE INVENTION

1. Field of the Invention

This invention relates to a deceleration control apparatus which can control a two-cycle engine of the spark ignition type for a vehicle, in which a fresh air/fuel mixture in a combustion chamber can be self-ignited at an ignition timing preferable for operation of the engine at least upon low load operation, so that, when engine sudden deceleration requirements are satisfied, the combustion condition is automatically changed over from an activated heat atmosphere combustion condition to an ordinary combustion condition to allow sudden deceleration of the engine.

2. Description of Background Art

In a conventional two-cycle engine of the spark ignition type for a motorcycle or a like vehicle, an exhaust port and a scavenging port which are each opened or closed by a piston are formed on an inner periphery of a cylinder bore, and a fresh air/fuel mixture pre-pressurized in a crank chamber is supplied into the cylinder chamber through the scavenging port while combustion gas in the cylinder chamber is exhausted through the exhaust port. The fresh air/fuel mixture supplied into the cylinder chamber is ignited by means of an ignition plug. Since it is necessary during idling to supply a fresh air/fuel mixture by more than a certain amount into the cylinder, a throttle valve in an intake air passage must be opened to a certain valve opening, particularly by more than about 10% of the full throttle amount.

Further, in such a conventional two-cycle engine of the spark ignition type as described above, if the exhaust port is made large in order to set the output power and the efficiency in a high speed, high load operation region, then, in a low load operation region, the amount of unburnt hydrocarbons in the exhaust gas is increased by blow-by of fresh air or unstable combustion, resulting in deterioration of the fuel efficiency.

In order to eliminate this problem, the present inventors developed a two-cycle engine of the spark ignition type wherein an exhaust control valve is actuated to an exhaust opening ratio in response to the engine speed and the throttle valve opening. The invention controls the in-cylinder pressure when the exhaust opening is closed by the piston at least in a low load operation region so that fresh air in a combustion chamber can be self-ignited at an ignition timing preferable for operation of the engine as disclosed in Japanese Patent Application No. Heisei 5-187488.

The combustion wherein the ignition timing preferable for operation of an engine is controlled positively to cause activated heat atmosphere combustion to take place in this manner is hereinafter referred to as AR combustion.

In a two-cycle engine of the spark ignition type in which AR combustion can take place, as shown in FIG. 6, the engine can sufficiently make effective use, in a low load operation region in which the throttle valve opening $θ_{th}$ is restricted, of heat energy included in burnt gas in the last cycle to activate a fresh air/fuel mixture in a combustion chamber to cause the engine to operate in a condition approximate to complete combustion. The two-cycle engine, therefore, has a higher output power characteristic than that in an ordinary combustion condition in which irregular combustion is involved. As a result, where the engine is utilized for driving a vehicle or the like, there is a disadvantage in that, even if the throttle valve opening $θ_{th}$ is reduced by a great amount while the engine is operating in a high speed, high load operation condition, the effect of a so-called engine brake by a sudden reduction of the output power of the engine cannot be anticipated sufficiently.

OBJECTS AND SUMMARY OF THE INVENTION

The present invention relates to improvement in a control apparatus for a two-cycle engine of the spark ignition type which has overcome the disadvantage described above and provides a deceleration control apparatus for a two-cycle engine of the spark ignition type for a vehicle wherein fresh air in a combustion chamber can be self-ignited at an ignition timing preferable to operation of the engine at least in a low load operation region. The control apparatus includes compression starting in-cylinder pressure adjustment means for adjusting a compression starting in-cylinder pressure, sudden deceleration requirement discrimination means for discriminating sudden deceleration requirements during the operation of the engine, and compression starting in-cylinder pressure control means for causing, in response to an output signal from the sudden deceleration requirement discrimination means, the compression starting in-cylinder pressure adjustment means to operate to an in-cylinder pressure at which AR combustion, wherein activated heat atmosphere combustion takes place, is impossible at an ignition timing preferable for operation of the engine.

Since the present invention is constructed in such a manner as described above, when the throttle valve opening $θ_{th}$ is decreased, the brakes are applied, the clutch is disconnected, a kill switch is switched off, a main switch is switched off or an error occurs with a control signal while the vehicle speed is lower than a certain vehicle speed or when an abnormality signal (reverse rotation or the like) is inputted, the sudden deceleration requirement discrimination means discriminates this and sends an output signal to the compression starting in-cylinder pressure control means. Consequently, the compression starting in-cylinder pressure adjustment means is rendered operative by the control means so that the compression starting in-cylinder pressure is adjusted to an in-cylinder pressure at which AR combustion cannot take place. Therefore, the engine is automatically changed over to an ordinary combustion operation condition in which the output power is low. Thus, the engine is decelerated suddenly.

Further, the present invention provides a deceleration control apparatus for a two-cycle engine of the spark ignition type for a vehicle wherein a fresh air/fuel mixture in a combustion chamber can be self-ignited at an ignition timing preferable to operation of the engine at least in a low load operation region. The control apparatus includes air fuel ratio adjustment means, sudden deceleration requirement discrimination means for discriminating sudden deceleration requirements during the operation of the engine, and air fuel ratio control means for causing the air fuel ratio adjustment means to operate to an air fuel ratio different from a stoichiometric air fuel ratio, in response to an output signal from the sudden deceleration requirement discrimination means. Due to the construction, when such conditions which require sudden deceleration as described above are satisfied, the air fuel ratio adjustment means operates so that the mixture gas in the combustion chamber is adjusted to an air/fuel mixture at which AR combustion is impossible and the engine is automatically changed over immediately to an ordinary combustion operation condition in which the output power is low. As a result, the engine is decelerated suddenly.

In this manner, in the present invention, when a condition in which rapid deceleration is required is entered, the driver can cause the engine to operate in ordinary combustion avoiding AR combustion to decelerate the engine suddenly without performing any operation, and accordingly, the driver can drive the vehicle very readily and exactly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is a characteristic diagram illustrating the condition in which the output power generation range varies when the air fuel ratio is varied.

PREFERRED EMBODIMENT OF THE INVENTION

Figure 1:
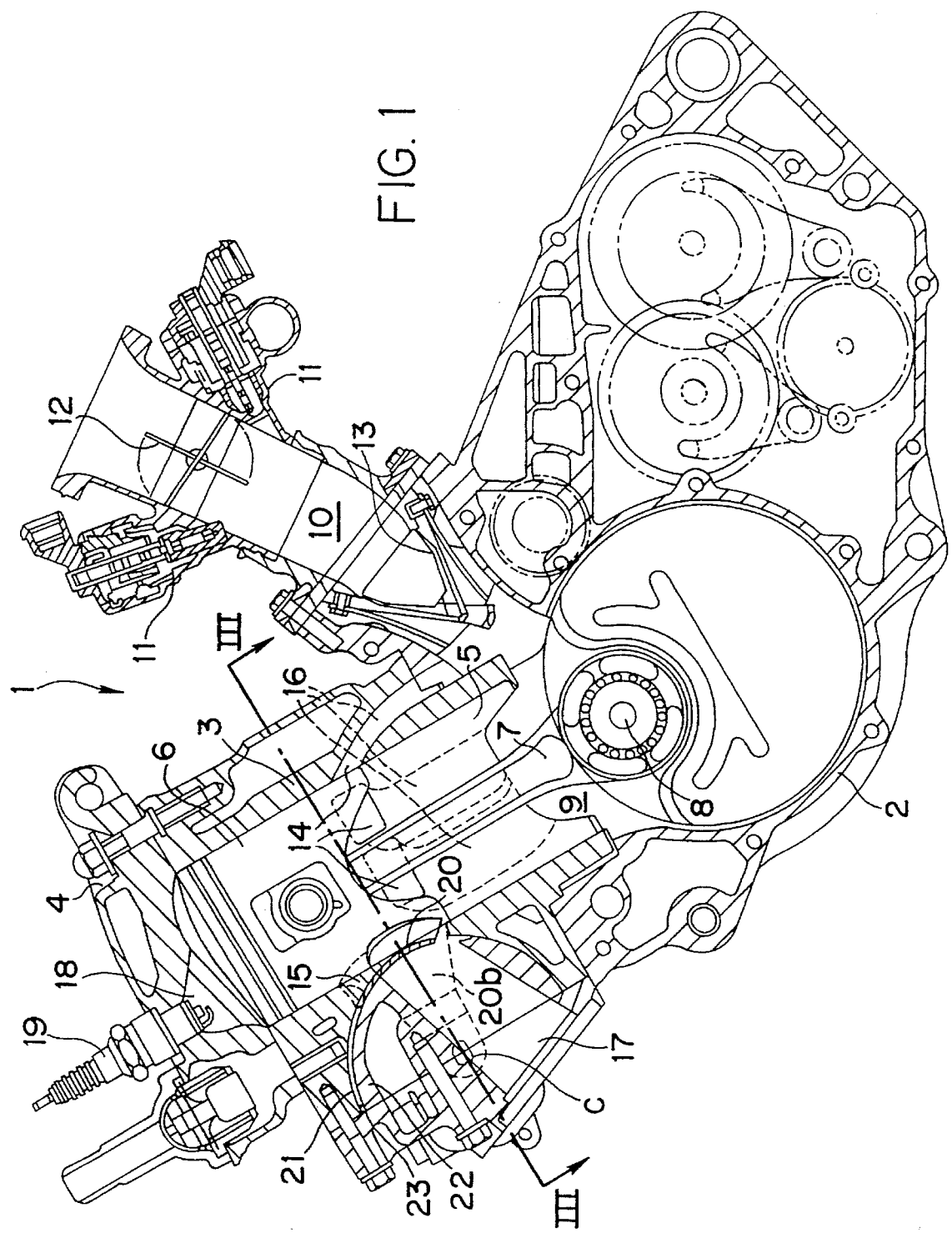
FIG. 1 is a vertical sectional side elevational view showing, in vertical section, a cylinder portion of a two-cycle engine of the spark ignition type which includes a deceleration control apparatus of the present invention.

In the following, an embodiment of the present invention shown in FIGS. 1 to 4 will be described.

A two-cycle engine 1 of the spark ignition type which includes a throttle valve control apparatus of the present invention is carried on a motorcycle, not shown. In the two-cycle engine 1 of the spark ignition type, a cylinder block 3 is mounted on a crank case 2, and a cylinder head 4 is mounted on the cylinder block 3.

A piston 6 is fitted for upward and downward sliding movement in a cylinder bore 5 formed in the cylinder block 3, and the piston 6 and a crank 8 are connected to each other by a connecting rod 7 so that the crank 8 is driven to rotate by upward and downward movement of the piston 6.

An intake air passage 10 is connected to a crank chamber 9 in the crank case 2. A throttle valve 12 of the butterfly type and a reed valve 13 are interposed in series in the intake air passage 10. A fuel injection valve 11 is disposed intermediately between the throttle valve 12 and the reed valve 13. The throttle valve 12 is connected to a throttle grip by way of a wire, not shown, so that when the throttle grip is twisted in one direction, the throttle valve 12 is opened.

Furthermore, the intake air passage 10 is connected to the crank chamber 9 of the crank case 2. Scavenging ports 14 and an exhaust port 15 are opened to an inner periphery of the cylinder bore 5. The scavenging ports 14 are connected to the crank chamber 9 by way of scavenging air passages 16 while the exhaust port 15 is communicated with an exhaust air passage 17.

A recessed portion of a combustion chamber 18 above the cylinder bore 5 is offset toward the exhaust port 15, and an ignition plug 19 is provided in the recessed portion of the combustion chamber 18. Fresh air mixed with fuel supplied from the fuel injection valve 11 is sucked into the crank chamber 9, which has been put into a negative pressure condition upon an upward stroke by way of the reed valve 13. The fresh air/fuel mixture is then compressed upon a downward stroke. Then, when the piston 6 moves down from the scavenging ports 14 to open the scavenging ports 14, the compressed fresh air is supplied into the combustion chamber 18, and as a result of the admission of the compressed fresh air, part of the combusted gas in the combustion chamber 18 is exhausted into the exhaust air passage 17 by way of the exhaust port 15. When the scavenging ports 14 and then the exhaust port 15 are closed as a result of upward movement of the piston 6, the air/fuel mixture in the combustion chamber 18 is compressed by the upward movement of the piston 6, and in the proximity of the top dead center, ignition by means of an ignition plug 19 or self-ignition by heat energy of the remaining gas of the last cycle takes place.

Further, an exhaust control valve 20 is provided in the proximity of the exhaust port 15. The exhaust control valve 20 is fitted in a gap 23, which is positioned between a recessed portion 21 having an arcuate vertical section provided on the cylinder block 3 and an exhaust air passage member 22 formed with a cross section having substantially the same shape as that of the recessed portion 21 and has substantially the same gap width. The exhaust control valve 20 is supported for upward and downward rocking motion around a center line c.

Figure 2:
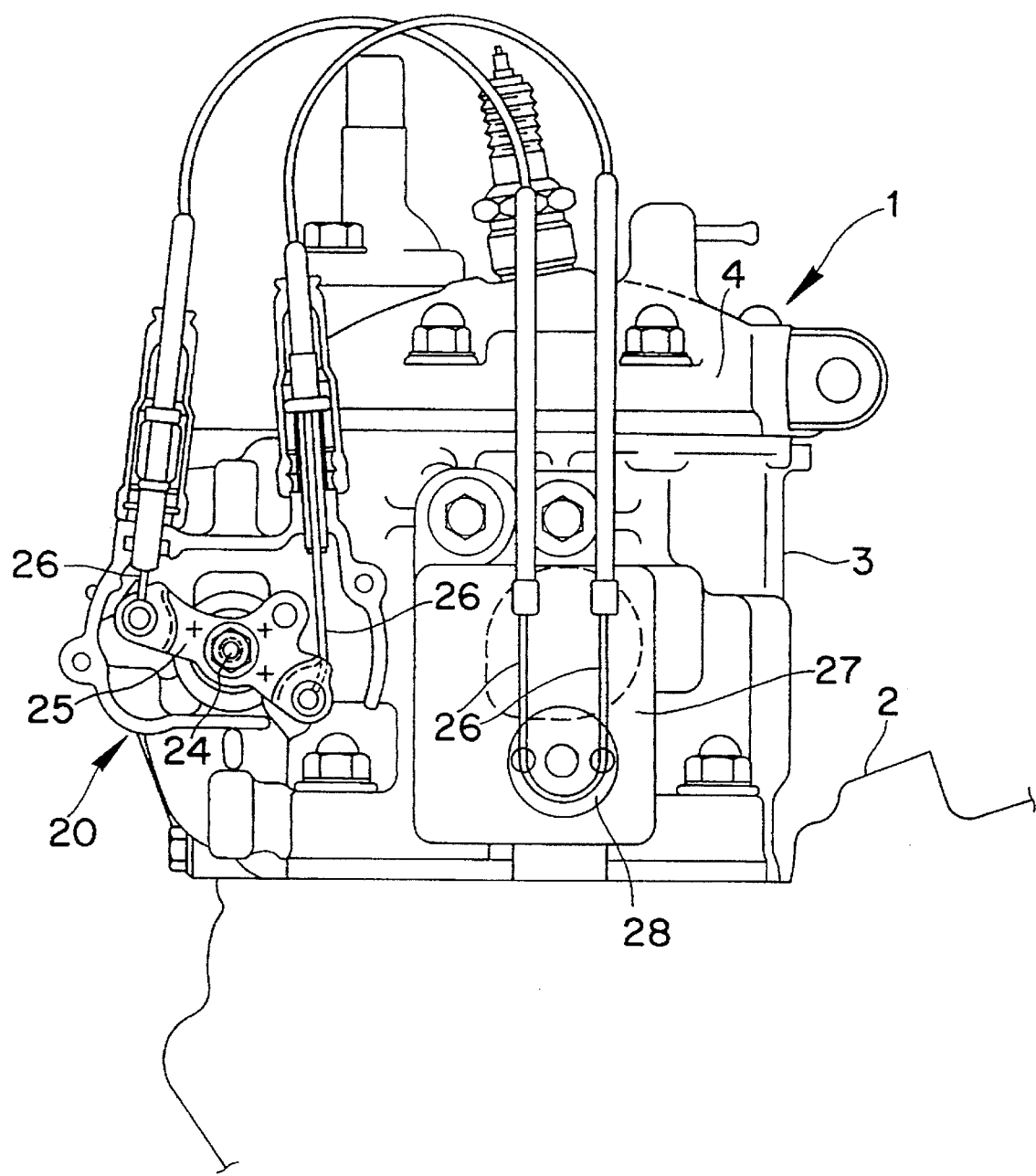
FIG. 2 is a side elevational view of the cylinder portion showing the same side face as in FIG. 1.

A drive lever 25 shown in FIG. 2 is integrally mounted on a drive shaft 24 integral with the exhaust control valve 20. The drive lever 25 is connected to a pulley 28 of an exhaust control servomotor 27 by way of a drive cable 26 so that the exhaust control valve 20 is driven to be rocked upwardly or downwardly by the exhaust control servomotor 27 so as to be set to a required exhaust opening ratio $\theta_e$ between 0 and 100%.

Figure 3:
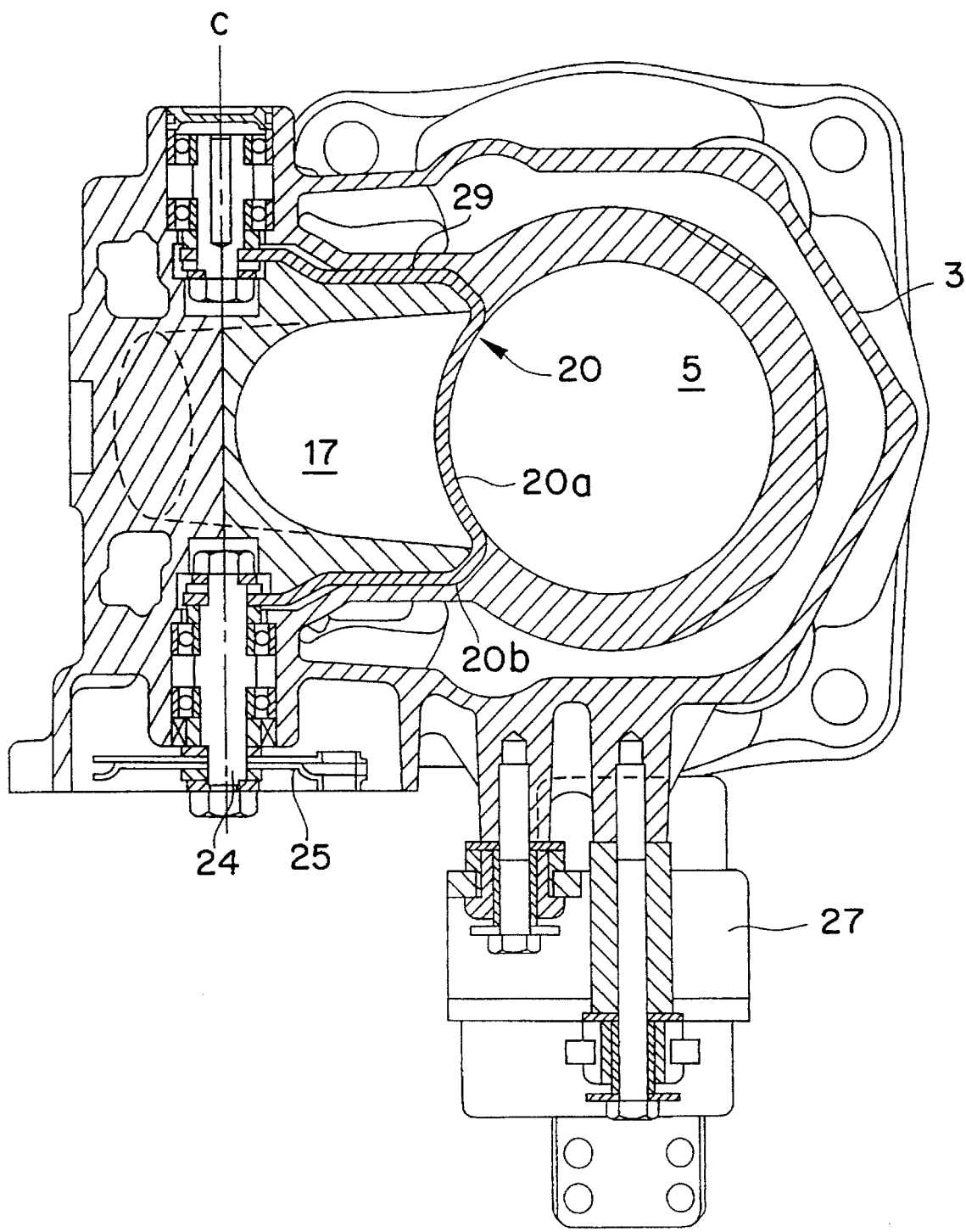
FIG. 3 is a horizontal sectional plan view taken along line III—III in FIG. 1.

The exhaust control valve 20 is formed so as to have a channel-shaped horizontal cross section as shown in FIG. 3. A side face arm portion 20b of the exhaust control valve 20 is fitted in a gap portion 29 positioned outwardly of the exhaust air passage 17 so that the side face arm portion 20b does not adversely influence the flow of exhaust gas. An arcuate portion 20a of the exhaust control valve 20 closes up the exhaust port 15.

Figure 4:
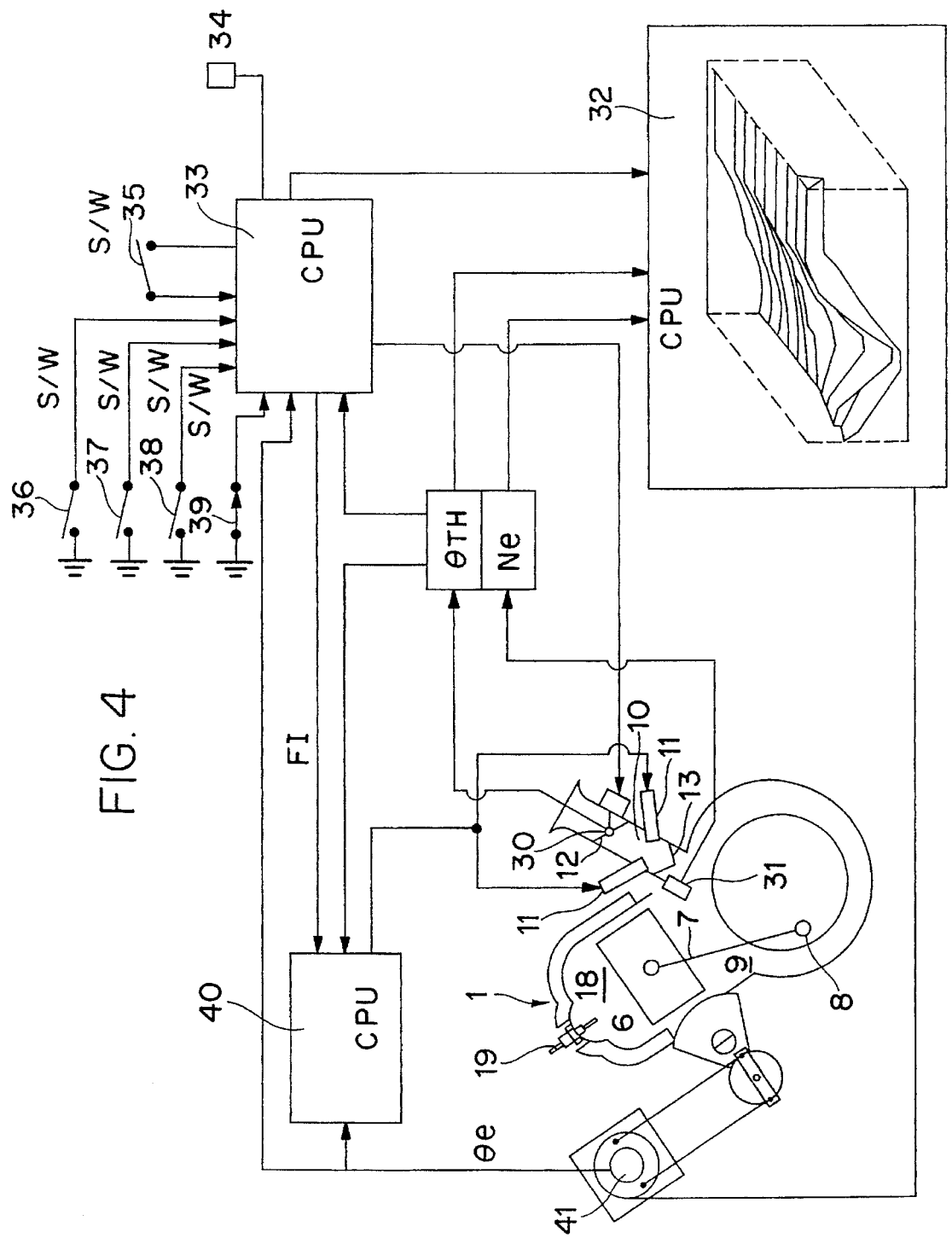
FIG. 4 is a schematic view showing an embodiment of the deceleration control apparatus for a two-cycle engine of the spark ignition type for a vehicle of the present invention.

FIG. 4 diagrammatically shows the parts of the two-cycle engine 1 of the spark ignition type according to the present invention. The throttle valve opening $\theta_{th}$ of the throttle valve 12 which is manually operated is detected by a throttle valve opening sensor 30 formed from a potentiometer or a like element and is inputted to an exhaust control valve CPU 32.

Further, an engine speed Ne detected by an engine speed sensor 31, an intake air pressure $P_i$ detected by an intake air pressure sensor not shown, a cooling water temperature $T_w$ detected by a water temperature gage, an indicator maximum pressure generation timing, an ignition timing or a compression starting pressure $P_{EC}$ detected by an indicator or light sensor, and so forth are inputted to the exhaust control valve CPU 32.

Furthermore, the exhaust control valve CPU 32 discriminates an operation condition of the two-cycle engine 1 of the spark ignition type from those input values and generates various control signals. In particular, the exhaust control valve CPU 32 operates in accordance with a control map of FIG. 5 which defines the exhaust opening ratio $\theta_e$ in accordance with the engine speed Ne and the throttle valve opening $\theta_{th}$, and transmits to the exhaust control servomotor 27 a drive signal $\Delta\theta_e$ at which the exhaust opening ratio $\theta_e$ by the map is provided.

Figure 5:
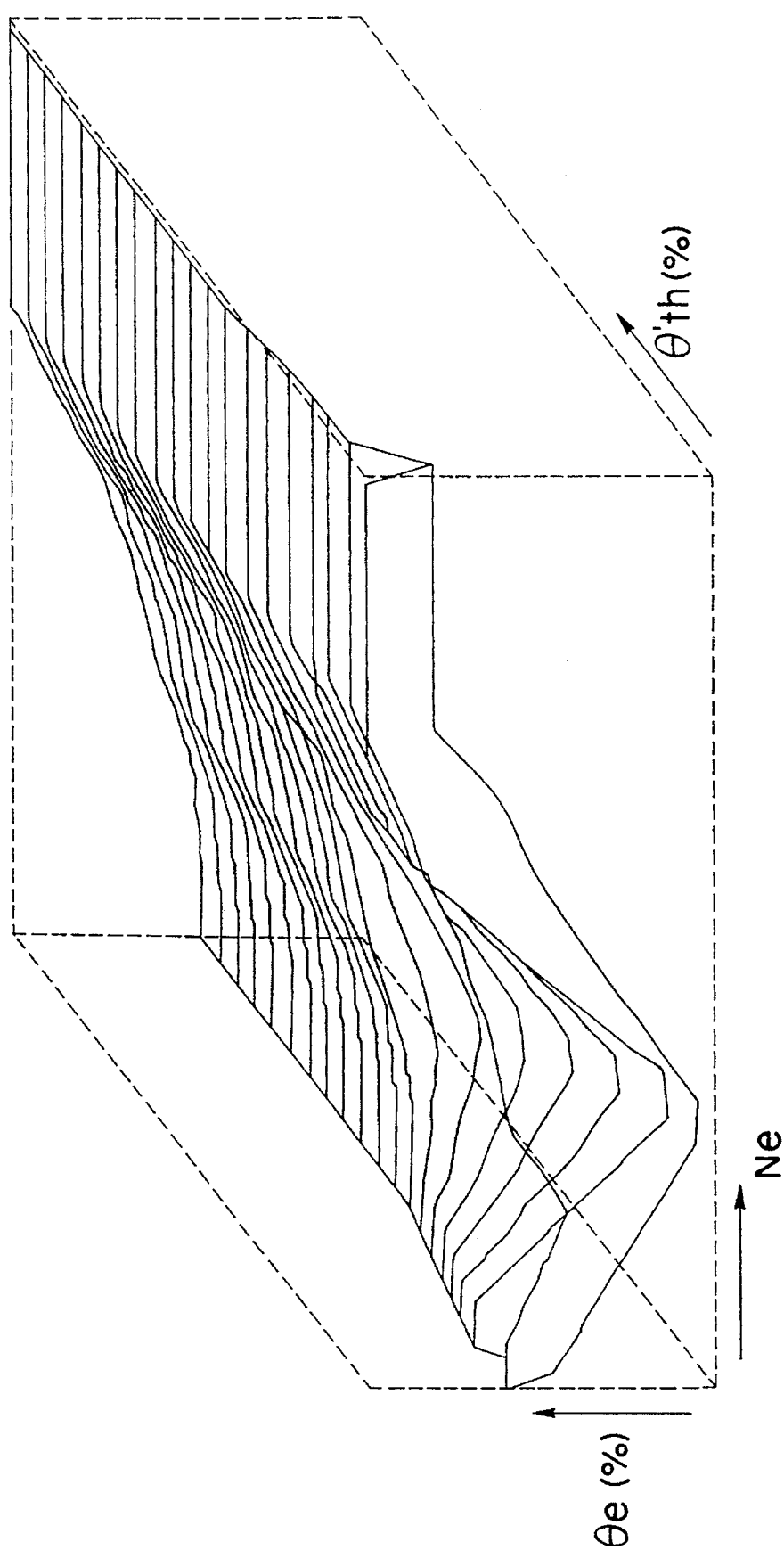
FIG. 5 is a drawing showing a control map.
Figure 6:
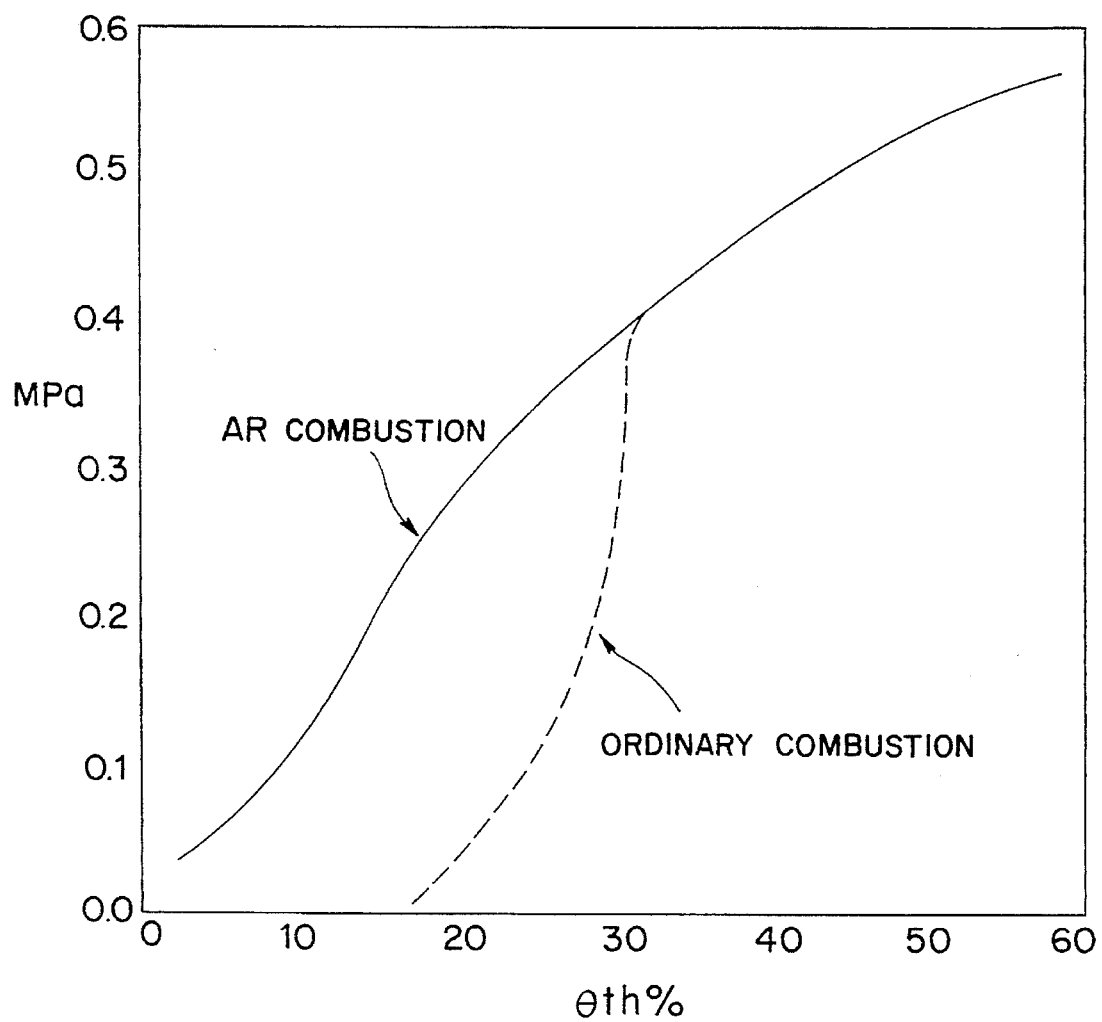
FIG. 6 is a characteristic diagram showing the relationships between the throttle valve opening $\theta_{th}$ and the output power of the two-cycle engine of the spark ignition type in AR combustion and ordinary combustion.

The exhaust opening ratio $\theta_e$ in the map of FIG. 5 provides a value at which an air/fuel mixture compressed in the cylinder can be ignited at an ignition timing most preferable for operation of the two-cycle engine 1 of the spark ignition type.

In FIG. 4, a sudden deceleration requirement discrimination CPU 33 is provided for discriminating conditions which require sudden deceleration of the vehicle. The sudden deceleration requirement discrimination CPU 33 receives a detection signal from the throttle valve opening sensor 30, detection signals from a vehicle speed sensor 34, a signal from a kill switch 35, a signal from a main switch 36, a signal from a brake switch 37 for detecting that the brakes are applied, a signal from a clutch switch 38 for detecting that the clutch is disconnected, and a signal from a gear position switch 39 for detecting that the shift operation position is operated to the neutral position. When the conditions which require sudden deceleration are satisfied, the sudden deceleration requirement discrimination CPU 33 transmits an exhaust control valve opening correction signal to the exhaust control valve CPU 32.

Meanwhile, a fuel injection control CPU 40 is provided for the fuel injection valve 11. The fuel injection control CPU 40 receives a throttle valve opening signal $\theta_{th}$ from the throttle valve opening sensor 30, an exhaust opening ratio signal $\theta_e$ from an exhaust opening ratio sensor 41 provided for the exhaust control servomotor 27, and a fuel injection amount correction signal FI from the sudden deceleration requirement discrimination CPU 33, and causes the fuel injection valve 11 to inject an appropriate amount of fuel.

Since the embodiment shown in FIGS. 1 to 4 is constructed in such a manner as described above, upon starting, the clutch is disconnected, the shift operation position is set to the neutral position, and the vehicle speed is 0. Consequently, the sudden deceleration requirements are satisfied. As a result, an exhaust control valve opening correction signal is sent from the sudden deceleration requirement discrimination CPU 33 to the exhaust control valve CPU 32. The exhaust control valve 20 is then set to an exhaust opening ratio $\theta_e$ higher than the exhaust opening ratio $\theta_e$ at which AR combustion can take place. Consequently, a sufficient fresh air/fuel mixture is supplied into the combustion chamber 18 so that the two-cycle engine 1 of the spark ignition type can be started readily.

Then, when low load operation is being performed in a condition wherein the vehicle is running and the opening of the throttle valve 12 does not exhibit a sudden variation, the sudden deceleration conditions are not satisfied with the sudden deceleration requirement discrimination CPU 33, and the exhaust control valve CPU 32 generates a control signal in accordance with the map shown in FIG. 5. Consequently, the exhaust control valve 20 is operated to an opening smaller than the exhaust opening ratio $\theta_e$ of ordinary spark ignition combustion operation, and AR combustion takes place in the combustion chamber 18 and the vehicle can run at a good fuel efficiency without much reduction of the vehicle speed.

However, when the driver tries to restrict the throttle valve 12 suddenly to apply an engine brake or tries to apply a sudden brake or else disconnects the clutch, the sudden deceleration requirements are satisfied, and an exhaust control valve opening correction signal is generated from the sudden deceleration requirement discrimination CPU 33 to the exhaust control valve CPU 32. The exhaust control servomotor 27 thus operates in accordance with the correction in a direction in which the opening increases so that the exhaust control valve 20 is opened, and consequently, self-ignition of the gas filled in the combustion chamber 18 is prevented and an ordinary spark ignition combustion condition is entered. Consequently, the output power of the two-cycle engine 1 of the spark ignition type is reduced by a great extent so that the vehicle is decelerated suddenly.

Simultaneously with this, in response to the fuel injection amount correction signal FI from the sudden deceleration requirement discrimination CPU 33, the fuel injection amount of the fuel injection valve 11 is increased or decreased in a direction displaced by a great amount from the stoichiometric air fuel ratio as shown in FIG. 7 by a control signal of the fuel injection control CPU 40, and the output power is decreased to a great extent and the vehicle is decelerated suddenly.

In this manner, in the embodiment shown in FIGS. 1 to 4, if the driver performs any of various operations intending to suddenly decelerate the two-cycle engine 1 of the spark ignition type, this is detected and the combustion of the combustion chamber 18 of the two-cycle engine 1 of the spark ignition type is controlled to ordinary spark ignition combustion without allowing AR combustion. Thus, since the output power of the two-cycle engine 1 of the spark ignition type can be reduced to a great extent, deceleration of the vehicle can be achieved very readily and with a good braking performance.

The vehicle can run with a higher degree of safety if, when an error occurs with a control signal in the control system of the two-cycle engine 1 of the spark ignition type, such error detection signal is transmitted to the sudden deceleration requirement discrimination CPU 33.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A deceleration control apparatus for a spark ignition two-cycle engine for a vehicle wherein a fresh air/fuel mixture in a combustion chamber can be self-ignited at an ignition timing at least in a low load operation region, comprising:

compression starting in-cylinder pressure adjustment means for adjusting a compression starting in-cylinder pressure by varying an exhaust opening in communication with said combustion chamber;

sudden deceleration requirement discrimination means for discriminating sudden deceleration requirements during the operation of said engine; and control means for causing, in response to an output signal from said sudden deceleration requirement discrimination means, said compression starting in-cylinder pressure adjustment means to increase said exhaust opening from an opening smaller than an exhaust opening for spark ignition combustion but where self-ignition may occur, to a larger opening to thereby cause said two-cycle engine to operate at an in-cylinder pressure at which self-ignition is prevented.

2. The deceleration control apparatus according to claim 1, wherein said compression starting in-cylinder pressure adjustment means includes an exhaust control valve.

3. The deceleration control apparatus according to claim 2, wherein said exhaust control valve is disposed in an exhaust port opened to an inner periphery of a cylinder bore.

4. The deceleration control apparatus according to claim 3, wherein said exhaust control valve is operated by an exhaust control servomotor.

5. The deceleration control apparatus according to claim 1, wherein said sudden deceleration requirement discrimination means receives signals from at least a throttle valve opening sensor, a vehicle speed sensor, a brake switch for detecting whether a vehicle brake is applied, a clutch switch for detecting whether a clutch is disconnected, and a gear position switch for detecting when a shift operation is set to a neutral position.

6. The deceleration control apparatus according to claim 1, further comprising air fuel ratio adjustment means for adjusting an air fuel ratio of an air/fuel mixture supplied to said two-cycle engine, and air fuel ratio control means for causing, in response to an output signal from said sudden deceleration requirement discrimination means, said air fuel ratio adjustment means to operate at an air fuel ratio different from a stoichiometric air fuel ratio necessary for self-ignition.

7. A deceleration control apparatus for a spark ignition two-cycle engine for a vehicle wherein fresh air/fuel mixture in a combustion chamber can be self-ignited at an ignition timing at least in a low load operation region, comprising:

air fuel ratio adjustment means for adjusting an air fuel ratio of a fresh air/fuel mixture supplied to said two-cycle engine;

sudden deceleration requirement discrimination means for discriminating sudden deceleration requirements during operation of said engine; and air fuel ratio control means for causing, in response to an output signal from said sudden deceleration requirement discrimination means, said air fuel ratio adjustment means to operate at an air fuel ratio different from a stoichiometric air fuel ratio necessary for activated heat atmosphere combustion.

8. The deceleration control apparatus according to claim 7, wherein said sudden deceleration requirement discrimination means receives signals from at least a throttle valve opening sensor, a vehicle speed sensor, a brake switch for detecting whether a vehicle brake is applied, a clutch switch for detecting whether a clutch is disconnected, and a gear position switch for detecting when a shift operation is set to a neutral position.

9. The deceleration control apparatus according to claim 7, wherein said air fuel adjustment means includes a fuel injection valve.

10. A method of controlling deceleration of a spark ignition two-cycle engine for a vehicle wherein a fresh air/fuel mixture in a combustion chamber can be self-ignited, comprising the steps of:

discriminating sudden deceleration requirements during operation of said two-cycle engine;

adjusting an in-cylinder pressure of said two-cycle engine in response to a discriminated sudden deceleration requirement in order to operate said two-cycle engine at an in-cylinder pressure at which activated heat atmosphere combustion is prevented; and adjusting an air fuel ratio of an air/fuel mixture supplied to said two-cycle engine in response to a discriminated sudden deceleration requirement to operate at an air fuel ratio different from a stoichiometric air fuel ratio necessary for activated heat atmosphere combustion.

11. The method of controlling deceleration of a spark ignition two-cycle engine according to claim 10, wherein said step of discriminating sudden deceleration requirements includes at least the steps of detecting a throttle valve opening, detecting whether a vehicle brake is applied, detecting whether a clutch is disconnected, and detecting when a shift operation is set to a neutral position.

12. A method of controlling deceleration of a spark ignition two-cycle engine for a vehicle wherein a fresh air/fuel mixture in a combustion chamber can be self-ignited, comprising the steps of:

discriminating sudden deceleration requirements during operation of said two-cycle engine;

adjusting an in-cylinder pressure of said two-cycle engine in response to a discriminated sudden deceleration requirement by increasing an exhaust opening of the combustion chamber from an opening smaller than an exhaust opening for ordinary spark ignition combustion but where self-ignition may occur, to a larger opening to thereby cause said two-cycle engine to operate at an in-cylinder pressure at which self-ignition is prevented.

13. The method of controlling deceleration of a spark ignition two-cycle engine according to claim 12, and including the step of adjusting an air fuel ratio of an air/fuel mixture supplied to said two-cycle engine in response to a discriminated sudden deceleration requirement to operate at an air fuel ratio different from a stoichiometric air fuel ratio necessary for self-ignition.

* * * * *